No. 875,565.　　　　　　　　　　　　　　PATENTED DEC. 31, 1907.
J. C. BARBER.
CAR TRUCK.
APPLICATION FILED SEPT. 30, 1907.
3 SHEETS—SHEET 1.
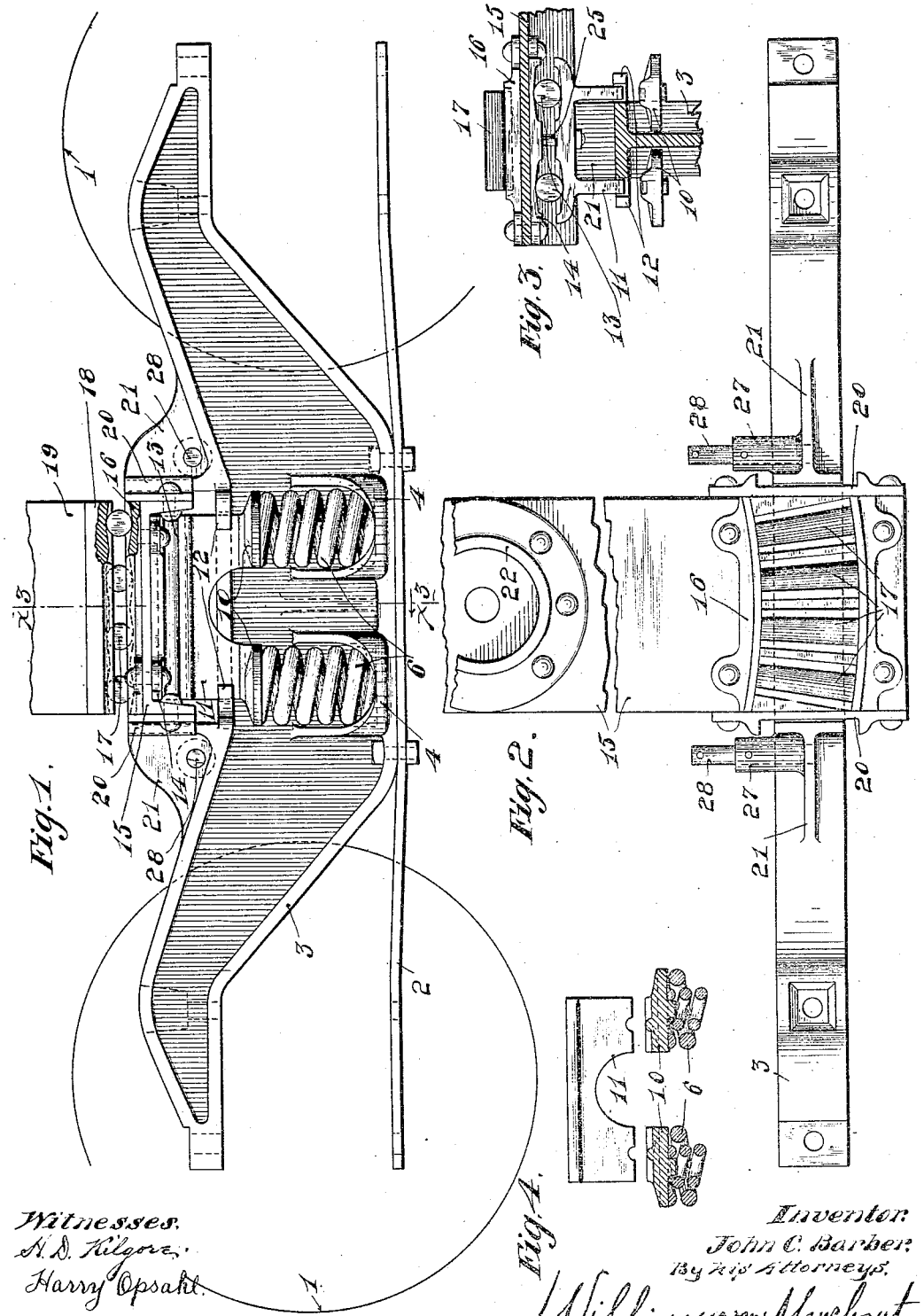
Witnesses.
A. D. Kilgore.
Harry Opsahl.
Inventor:
John C. Barber.
By his Attorneys.
Williamson & Merchant.

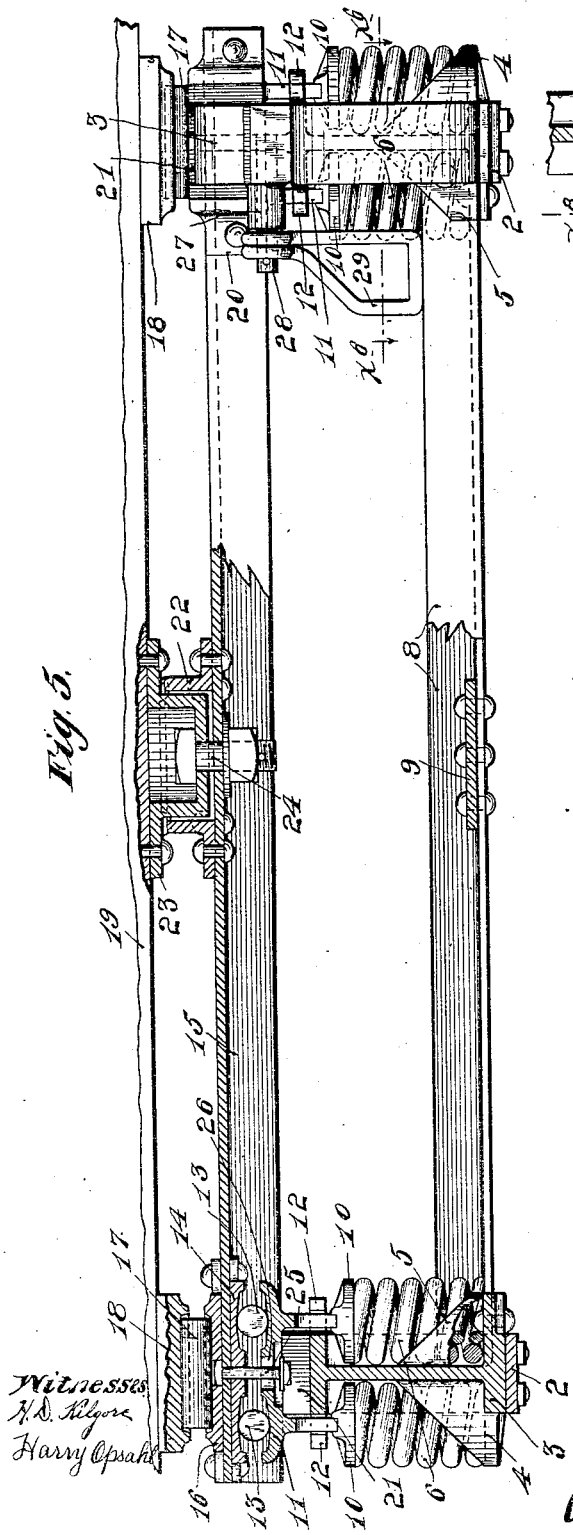

No. 875,565.
J. C. BARBER.
CAR TRUCK.
APPLICATION FILED SEPT. 30, 1907.
PATENTED DEC. 31, 1907.
3 SHEETS—SHEET 3.
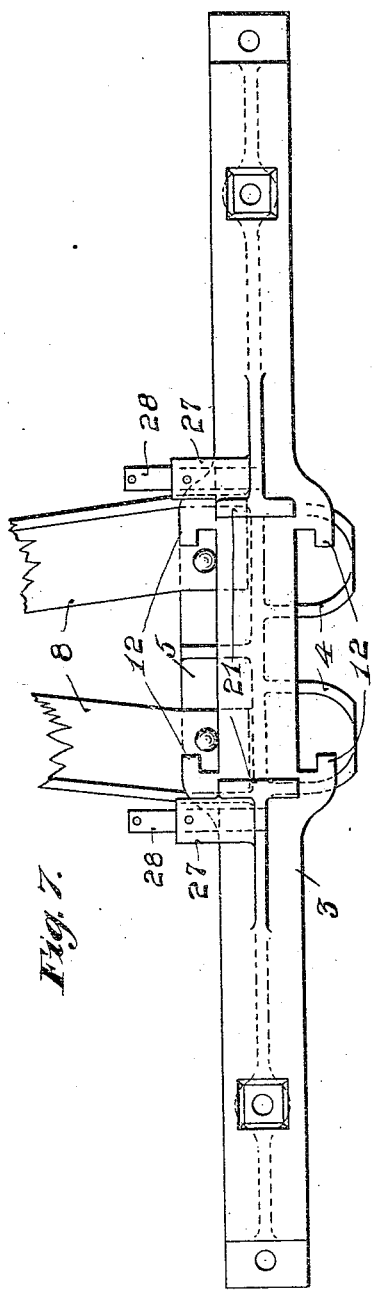
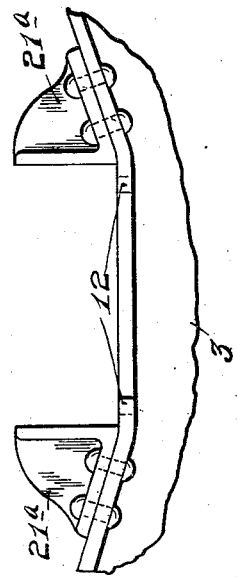
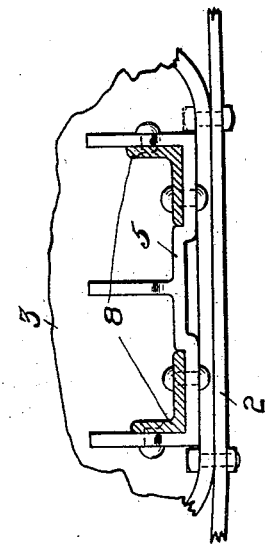
Witnesses:
H. D. Kilgore.
Harry Opsahl.
Inventor:
John C. Barber.
By his Attorneys,
Williamson & Merchant

UNITED STATES PATENT OFFICE.

JOHN C. BARBER, OF CHICAGO, ILLINOIS.

CAR-TRUCK.

No. 875,565.　　　Specification of Letters Patent.　　　Patented Dec. 31, 1907.

Application filed September 30, 1907. Serial No. 395,114.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to car trucks of the general type disclosed in my numerous prior patents, wherein provision is made for a limited lateral motion of the car body relative to the truck, in addition to the customary swiveling motion of said parts, and wherein both the lateral and the radial motions are taken on anti-friction rollers.

More specifically stated, my present invention relates to a car truck adapted to support the car body and its load through the side bearings, with provision for both the lateral and swiveling motions, on the same general principle as disclosed in my prior patent 863,012, of date August 13, 1907; and my present invention has for its object to provide a car truck having cast steel girder side frames and coöperating parts adapted advantageously to afford the said lateral and radial motions, with the car body and its load so carried on the side bearings.

To this end, my invention consists of the novel devices and combinations of devices hereinafter described.

My improved truck is illustrated in the accompanying drawings, wherein like notations refer to like parts throughout the several views.

In said drawings: Figure 1 is a view in side elevation, with some parts shown in section, some parts removed, and the position of other parts represented in diagram only. Fig. 2 is a plan view of the parts shown in Fig. 1, with the car body bolster removed, some parts being broken away. Fig. 3 is a detail in section, on the line $x^3 x^3$ of Fig. 1, with the body bolster removed and some parts broken away. Fig. 4 is a detail showing one of the lower members of the lateral motion bearing plates, in side elevation as in Fig. 1, and the underlying or supporting springs and spring caps in section, with the plate and spring caps separated from each other. Fig. 5 is a view chiefly in vertical cross section through the truck but partly in end elevation, with some portions broken away. Fig. 6 is a view of some of the parts shown in Fig. 5 chiefly in plan but partly in horizontal section, on the line $x^6 x^6$ of Fig. 5. Fig. 7 is a plan view of one of the girder side frame castings, with some of the parts supported thereby removed therefrom. Fig. 8 is a detail in vertical section on the line $x^8 x^8$ of Fig. 6; and Fig. 9 is a detail in plan view showing part of a girder frame with slightly modified form of the bolster column lugs.

Referring to Fig. 1, the diagram lines 1 represent the positions of the wheels of a car truck.

The numeral 2 represents one of the bottom tie bars and the numeral 3 represents one of the cast steel girder-type side frames. This side frame casting 3 has cast integral therewith spring supporting brackets, with one set thereof projecting outward from the main vertical web of the casting, marked with the numeral 4, and the other set thereof projecting inward from the inner face of the said web and marked with the numeral 5, this inner set 5 being integral with each other and having its opposite end portions depressed relative to its central or raised portion. The outer brackets 4 serve simply as spring supports or base plates, and are of pocket-like form to retain the lower ends of the springs 6 in proper working position. The inner or one piece bracket 5 has a double function, serving as a means for connecting the ends of the double cross tie 8 to the side frame in such a way as to bring the ends of the cross ties on the same level as the raised portion of the bracket, and then coöperating with these parts to support the inner pair of the springs 6. The cross ties 8 are bent toward each other so as to meet at their central portions, and are there connected together by binding plate 9 riveted or otherwise rigidly secured to the horizontal webs of the angle bars out of which the cross ties 8 are made, all as clearly shown in Figs. 5, 6 and 7. The double brackets 5 have end flanges and the ends of the double cross ties 8 are riveted, both to the horizontal and the vertical webs or flanges of the said brackets 5. With the cross ties 8 thus secured to the inwardly projecting brackets 5 of the opposite or pair of side frame castings 3, it is, of course obvious that the said side frames are rigidly connected thereby. The shape to which the said cross ties 8 are bent make the same, when united by the binding plate 9, constitute an X-shape cross tie which is best adapted to afford the greatest strength and the best distribution of the strains which must be taken thereby. The vertical rivets connecting the horizontal webs of the ends of the cross ties 8 with the brackets 5 serve to center the lower ends of the inner sets of springs 6 which rest on the ends of said cross ties and the raised or central portions of said brackets 5, as best shown in Figs. 5 and 6.

It will be seen that the springs 6 are thus located in two sets on opposite sides of the central vertical eb of the girder casting 3. On the springs 6 are mounted separate spring caps 10 with centering lugs on their upper faces.

The numerals 11 represent the lower members of the lateral motion roller bearing plates, and are so constructed as to afford downwardly projecting legs which straddle the top girders or flanges of the side frame castings 3; and because of this fact may hereinafter, for brevity, be called the straddlers or straddling plates. The depending legs of the said straddlers 11 rest on the spring caps 10, one leg resting on the outer pair of spring caps and the other on the inner pair of spring caps, and these legs being provided with notches which register with the raised centering lugs of the caps, as clearly shown in Figs. 4 and 5. The straddlers 11 are mounted with freedom for vertical motion, in respect to the side frame castings 3, under the spring action, but are held against any lateral motion; and for this purpose the straddling legs are embraced by lugs 12 of hook-like form projecting from the top girder or flange of the casting 3, as best shown in Figs. 1, 5 and 7, so that the legs of the said plates 11 work between the said lugs 12 and the top girder of the casting 3, and are thereby guided and held for straight line vertical action, and prevented from any lateral motion or forward and backward motion on the said castings 3. On the faces or bearing surfaces of the said plates 11 are mounted the lateral motion rollers 13. On these rollers 13 rest the top members 14 of the lateral motion bearing plates. These plates 14 are riveted or otherwise secured to the under surface of the truck bolster 15, at the opposite ends of the bolster, or directly over the lower bearing plates or straddlers 11, as best shown in Figs. 1 and 5. The bolster 15 is conveniently made of a simple channel bar, and the upper bearing plates 14 are riveted to the under surface of the horizontal web of the channel, the channel being applied with this web uppermost, as shown. To the upper surface of the bolster 15, at its opposite ends, are riveted or otherwise rigidly secured the bottom members 16 of the side bearing plates, and on these rest the side bearing rollers 17, disposed crosswise of the lateral motion rollers 13, on radial lines intersecting the center of the truck, as best shown in Figs. 2 and 5. On the side or radial motion rollers 17 rest the top members 18 of the side bearings, these being riveted or otherwise rigidly secured to the ends of the car body bolster 19. These side bearing plates 16 and 18 are of the proper shape, on their bearing surfaces, to afford treads for the rollers 17, which will permit the latter to travel in the arc of a circle struck from the center of the truck, as clearly shown in Fig. 2. The truck bolster 15 is provided with stop lug chafing plates 20 which work between bolster guide lugs 21 or 21ª rising from and rigidly secured to the top girder of the side frame castings 3. These bolster guide lugs may be cast integral with the said castings 3, as those shown in the main views and marked with the numeral 21, or they may be separately cast and be riveted or bolted to the said castings 3, as in the slight modification illustrated in Fig. 9. The stop lugs of the chafing plates 20 are properly spaced to permit due lateral motion of the truck bolster 15 and to limit the same by coming in contact with the sides of said bolster lugs 21; and, of course, the said lugs 21 serve to guide the bolster in its up and down motion and to take the forward and backward thrusts therefrom.

The truck and body bolsters are connected for the customary swiveling motion, on the cross center of the truck, by center or swivel plate members 22 and 23, which telescope with each other, with the lower plate 22 rigidly secured to the truck bolster 15 and the upper member 23 rigidly secured to the body bolster 19, and the two separably connected by a nutted king bolt 24, as clearly shown in Fig. 5. It should be noted that these plates 22 and 23 do not sustain any part of the load, but serve simply to afford the swiveling connection between the car truck and the car body. The load is carried entirely through the side bearings and directly over the vertical web of the side frame castings 3 on the springs 6, with freedom for the customary yielding or spring cushioned motion, in a vertical direction, freedom for a limited lateral motion on the rollers 13, and with freedom for the required radial motion on the side bearing rollers 18. The load is therefore carried in the most advantageous manner, for the best distribution of the strains therefrom on the truck, while, at the same time, keeping the well recognized advantage of the radial and lateral motions on rollers, reducing the friction and the wear and tear on the wheel flanges and the rails, in rounding curves.

As a detail, to prevent loss of the rollers 13 or of the straddlers 11, in case of derailment, the said plates 11 are connected to the truck bolster 15 by nutted bolts 25 carried by the bolster and working in laterally elongated slots 26 of the plates 11, as best shown in Fig. 5. The bolt is of such length and so applied as to afford a loose connection between the said connected parts, permitting the bolster to rise slightly relative to the underlying bearing plate 11, under the lateral travel of the rollers 13 to the higher parts of their bearing surfaces on the opposing faces of the plates 11 and 14; and the slots 26 in the plates 11 must be of the requisite length to permit the limited lateral travel of the bolster 15 relative to the plates 11. The bearing surfaces of the plates 11 and 14, on which the lateral motion rollers 13 travel, are of the kind disclosed and claimed in prior patent 784,096, granted to Lee W. Barber, of date March 7, 1905, and have all the advantages therein noted. As a further detail, it will be seen, by reference to Figs. 2 and 5, that the side frame castings 3 have cast integral therewith socket lugs 27, in proper positions to support bearings 28 for brake hangers 29. The X-shape of the cross ties 8 affords the requisite clearance for the support of the brake beam (not shown), from these bearings 28 and hangers 29.

In addition to the advantages already noted, as resulting from the way in which the load is carried on this truck, it should be further noted that the parts required for properly mounting the springs, the bolster and the anti-friction devices, do not in any wise weaken the side frames or girder castings 3, but some thereof, such as the projecting brackets 4 and 5 and the bolster guide lugs 21, considerably strengthen said main castings 3.

Comparing with my prior patent 863,012, of August 13, 1907, it should be noted that in my said prior patent, the truck bolster therein disclosed has no lateral motion; but simply has a vertical motion, and itself carries the bottom members of the lateral motion roller bearing plates, on which the rollers travel and which support the so-called floating plate 17 located between the lateral motion and the side motion rollers. The same remarks apply in substance to the Lake and Deverell patent 798,350, of August 29, 1905, referred to in my patent 863,012. Otherwise stated, the Lake and Deverell truck bolster has no lateral motion.

So far as I know, my present design herein disclosed, is the first wherein the load is carried through the side bearing rollers and lateral motion rollers directly from the side frames, and wherein the truck bolster is free for lateral motion. This is an improvement in many respects. The two bolsters always travel together in the lateral motion, and hence the two swivel or turn angularly, in respect to each other, on a uniform or constant center in the radial motion; and this relation of the said parts affords a more reliable and stable distribution of the strains from the load. Incidentally, this improvement makes it unnecessary to have any elongated slot in either of the telescoping center plates for the king pin. Otherwise stated, the swiveling connections can be made much closer, more stable and reliable.

What I claim is:

1. In a car truck, the combination with truck and body bolsters connected for swiveling motion in respect to each other, of lateral motion and radial motion anti-friction bearings supporting the car body and its load directly from the side frames, with freedom for the lateral motion of said truck bolster on said lateral motion anti-friction bearings and freedom for the radial motion of said body bolster on said radial motion anti-friction bearings, substantially as described.

2. In a car truck, the combination with side frames, of truck and body bolsters connected for swiveling motion in respect to each other, bolster supporting springs on said side frames, lateral motion bearing rollers and bearing plates for said truck bolster, with the lower members of said plates resting on the caps of said springs and held by said frames with freedom for vertical motion only, and radial motion rollers and bearing plates for said body bolster, with the lower members of said plates fixed to the truck bolster directly over the top members of the lateral motion bearing plates, whereby the car body and its load is spring supported directly from the side frames, through the said anti-friction bearings, with freedom for the truck bolster and body bolster to move laterally together and to swivel or move angularly in respect to each other on said side bearing rollers, substantially as described.

3. In a car truck, the combination with side frames having bolster supporting springs thereon, of a truck bolster and lateral motion rollers and bearing plates for the same, the lower members of which plates have depending legs which straddle the side frames and rest on the bolster spring caps and are supported with freedom for vertical motion but held against any lateral motion or forward and backward motion, in respect to said frames, substantially as described.

4. In a car truck, the combination with the cast steel, girder-type side frames having the bolster spring supporting brackets cast integral therewith and projecting from the opposite sides thereof, the springs mounted thereon in two equal sets on opposite sides of the vertical webs of said frame castings, the truck bolster and the lateral motion rollers and bearing plates, the lower members of said bearing plates having depending legs which rest on the spring caps and straddle the top girders of said side frames, and which side frames are provided with retaining lugs embracing the legs of said plates and coöperating with the top girders of said frames to hold the said plates with freedom for vertical motion but against any lateral motion or forward and backward motion, substantially as described.

5. In a car truck, the combination with a side frame and a truck bolster, of lateral motion rollers and bearing plates for said bolster, the lower members of which plates are spring mounted on said side frames, with freedom for vertical motion but are held against any lateral motion or forward and backward motion, and loose connections uniting said bolster with said lower bearing plates with freedom for lateral motion of the bolster but preventing the separation of the upper and lower bearing plates far enough for the escape of the rollers, substantially as described.

6. In a car truck, the combination with cast steel side frames, of the girder-type, having brackets cast integral therewith projecting from opposite sides of the central web thereof, bolster springs supported from said brackets and provided with spring caps, lateral motion rollers and bearing plates for said bolster, the lower members of which plates are provided with depending legs which straddle the top flanges of said side frames and rest on said spring caps for supporting said bolster above the side frames, and bolster guide lugs rising from the top girders of said side frames, substantially as and for the purposes set forth.

In testimony whereof I affix my signature in presence of two witnesses.

JOHN C. BARBER.

Witnesses:
JAS. F. WILLIAMSON,
H. D. KILGORE.